(12) United States Patent
Irwin et al.

(10) Patent No.: US 6,234,499 B1
(45) Date of Patent: May 22, 2001

(54) HEAVY OBJECT TRANSPORTING APPARATUS

(75) Inventors: David G. Irwin, Campbell, CA (US); Joel H. Petersen, Grants Pass, OR (US); Bret A. Spurlock, Los Altos, CA (US)

(73) Assignee: Beam Buddy, Inc., Grants Pass, OR (US)

( * ) Notice: Subject to any disclaimer, the term of this patent is extended or adjusted under 35 U.S.C. 154(b) by 0 days.

(21) Appl. No.: 09/209,673

(22) Filed: Dec. 11, 1998

Related U.S. Application Data
(60) Provisional application No. 60/069,550, filed on Dec. 12, 1997.

(51) Int. Cl.[7] .................................................. B67C 1/00
(52) U.S. Cl. ........................................... 280/63; 280/79.7
(58) Field of Search .................................. 280/79.5, 79.6, 280/79.7, 79.11, 63, 47.131, 47.19

(56) References Cited

U.S. PATENT DOCUMENTS

| | | | |
|---|---|---|---|
| 3,717,357 | * 2/1973 | Schaefer | 280/79.11 |
| 5,048,850 | * 9/1991 | McDonald | 280/79.7 |
| 5,181,731 | * 1/1993 | Gustavsen | 280/63 |
| 5,318,316 | * 6/1994 | Shurtleff | 280/79.7 |
| 5,332,243 | * 7/1994 | Berry | 280/63 |
| 5,779,252 | * 7/1998 | Bolton, Jr. | 280/47.371 |
| 5,806,868 | * 9/1998 | Collins | 280/79.6 |
| 5,820,145 | * 10/1998 | Osowski | 280/79.7 |

FOREIGN PATENT DOCUMENTS

| | | | |
|---|---|---|---|
| 19867 | * 12/1890 | (GB) | 280/79.7 |
| 2224701 | * 5/1990 | (GB) | 280/79.6 |

* cited by examiner

Primary Examiner—Brian L. Johnson
Assistant Examiner—James S. McClellan
(74) Attorney, Agent, or Firm—Earl Bright

(57) ABSTRACT

A heavy object transporting apparatus having at least one heavy object supporting surface supported by an axle located between two relatively large diameter inflated tires.

11 Claims, 2 Drawing Sheets

HEAVY OBJECT TRANSPORTING APPARATUS

This application claims the benefit of U.S. Provisional Application No. 60/069,550 filed Dec. 12, 1997, which is incorporated herein by reference in its entirety.

FIELD OF THE INVENTION

The present invention relates to apparatus used at construction sites, particularly to apparatus for transporting heavy, long objects such as lumber, steel beams, sliding glass doors, windows, and laminated wood beams.

BACKGROUND OF THE INVENTION

At new or remodeling construction sites heavy, long beams and other large, heavy objects are incorporated into the structure being built. These beams and other heavy objects must be moved from a truck to the point of use at the construction site. Typically, heavy, long beams and other heavy objects are lifted and carried by two or more workers from the truck or from a location where they have been unloaded from the truck to the area within the construction site where they are to be used. Up to six workers are required to move one 30 foot beam. Many times the location where the beam is to be used is deep within the construction site and requires the beam to be moved across rough, uneven terrain including grass, rocks, tree roots, scraps and other obstacles. Furthermore, it may be necessary to move the beam through a narrow pathway between a fence on the property line and the existing structure. Because of the length, and particularly the weight (for example, several hundred pounds) of the beams or other large objects, it is very difficult for two or more workers to carry the beam over the rough, uneven terrain.

SUMMARY OF THE INVENTION

The present invention overcomes the disadvantages associated with prior art methods. of two or more employees lifting and transporting long, heavy beams and other heavy objects over uneven terrain. The present invention is comprised of at least one heavy object supporting surface attached to a cross member. The cross member and supporting surface are supported by an axle and two large inflated tires. Optionally, but preferably, the apparatus comprises a second heavy object supporting surface having a different width than the first supporting surface and being located on the opposite side of the axle from the first supporting surface.

In use, a long, heavy object is placed on one of the supporting surfaces between the two large inflated tires by one or two workers such that one worker can then grasp the end of the heavy, large object and push or pull the apparatus over uneven terrain and through narrow locations.

DETAILED DESCRIPTION OF THE PREFERRED EMBODIMENTS

Figure 1:
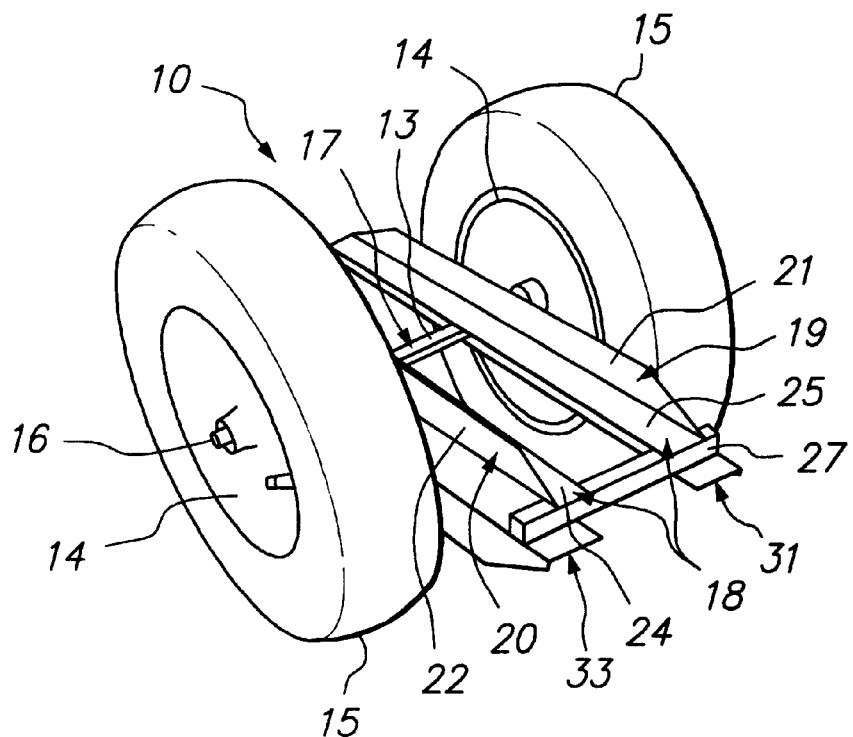
FIG. 1 is a upper left perspective view of the apparatus of the present invention.
Figure 2:
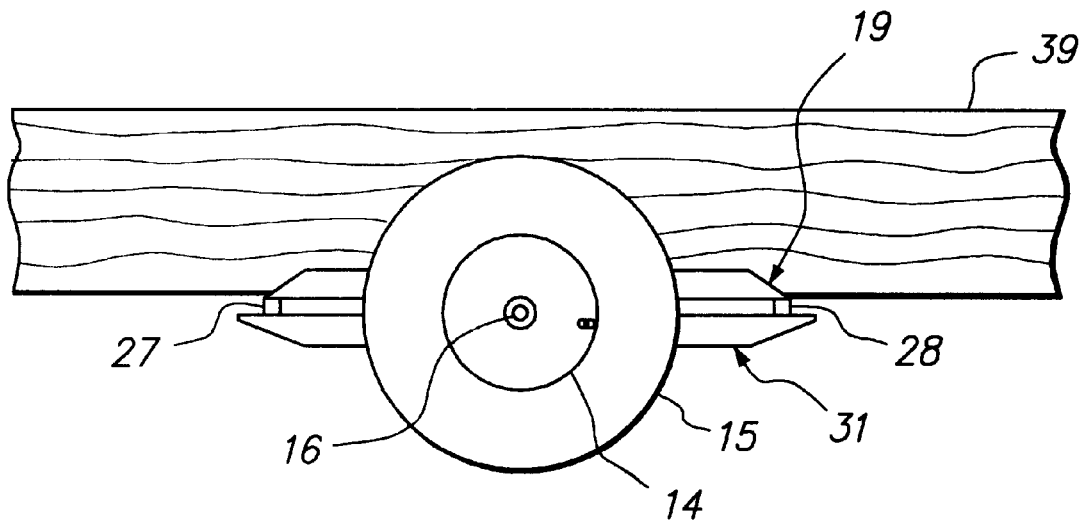
FIG. 2 is a right side view of the present invention with a beam loaded thereon.

Referring to FIGS. 1 and 2, the apparatus 10 of the present invention is comprised of two wheels 14 connected by an axle 16. Mounted on the wheels 14 are inflated tires 15. In one embodiment, the wheels are nine inches in diameter and the tires are 16 inches in diameter. An important aspect of the present invention is the rather large inflated tires 15. It is within the scope of the present invention that other tires and/or wheels that are not inflated but which function equivalently as the inflated tires can be used. We have discovered that the flexibility of the tires, as opposed to solid tires, is important to the invention in that the flexibility allows the apparatus with a heavy load to pass over curbs, exposed roots, and scrap lumber at a construction site. The flexibility and large, heavy load capacity of the inflated tires (e.g., 400 pounds each) allow the apparatus to move easily over rough terrain and obstacles while carrying several hundred pounds of load. Other important features of the tires and wheels of the present invention is the rather significant ground clearance provided by the tires, the easy maneuverability of a loaded apparatus (including spinning around at one location) and, as will be discussed below, the location of the supporting surface above the axle of the tires and wheels and the supporting surface being centered along its length on the axle.

Figure 4:
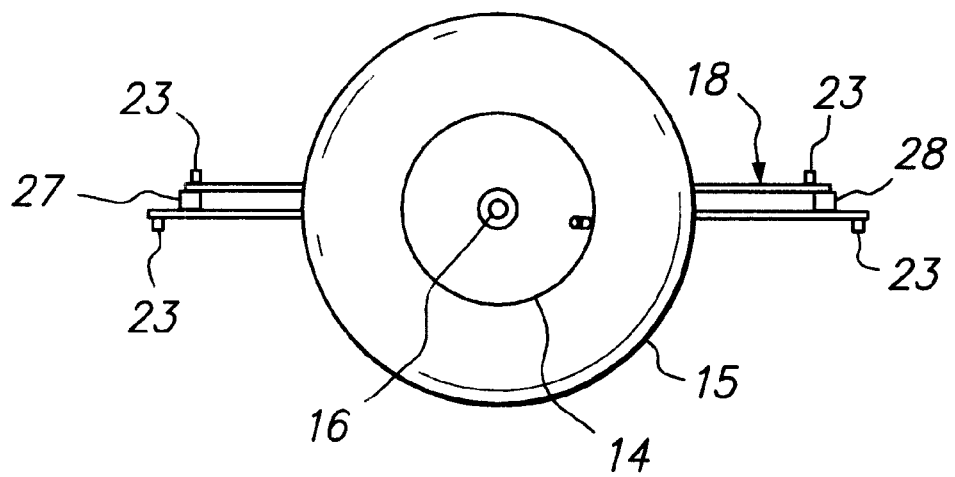
FIG. 4 is a right side view of another embodiment of the present invention.

Axle 16 is located within cross member 17. Attached to a top or first surface 13 of the cross member 17 is a first heavy object supporting surface or platform 18 comprised of the horizontal portions 24 and 25 of two elongated L-shaped members 19 and 20 welded to the cross member 17. The vertical portions 21 and 22 of the L-shaped members 19 and 20, respectively, are preferable so as to prevent a beam or large, heavy object located on the supporting surface 18 from contacting the wheels or tires during steering of the apparatus. The L-shaped members function as a tray holding the sides of a beam so the beam does not get wedged in the tires. The same function can be accomplished in other ways such as a post 23 (FIG. 4) located at the far ends at the outside corners of each horizontal portion 24 and 25.

In a preferred aspect, the first supporting surface 18 is preferably spaced to accommodate 6 inch wide objects or narrower. The length of the first supporting surface 18 is sufficient to provide support for a long, heavy beam (for example, 12 or 14 feet long) and sufficient to extend beyond the diameter of the tires. In a preferred aspect, located at each end of the first supporting surface 18 are cross members 27 and 28 (FIG. 2) that provide greater stability to the distal ends of the supporting surfaces.

Figure 3:
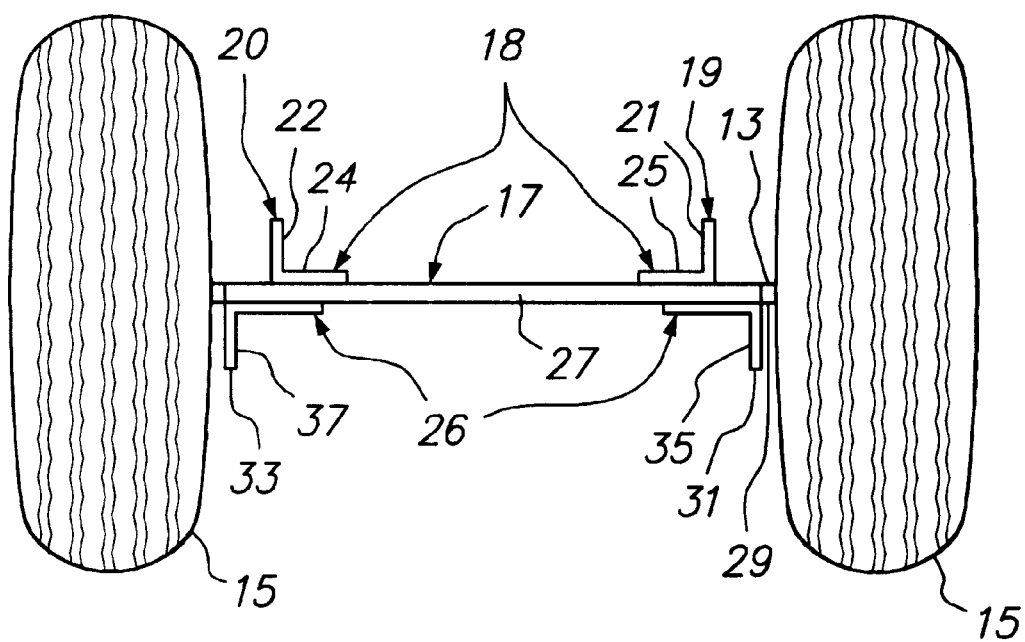
FIG. 3 is a front elevational view of the present invention.

Optionally, but in a preferred aspect, on the bottom or second side 29 (FIG. 3) of the cross member 17 opposite of the first supporting surface 18 is a second heavy object supporting surface 26 which is comprised of two elongated L-shaped brackets 31 and 33 with the two vertical portions 35 and 37, respectively, of the L-shaped brackets being spaced farther apart than the two vertical portions 21 and 22 of the first supporting surface 18 so as to be able to accommodate wider objects, (for example 6¾ inch or 7⅝ inch wide laminated beams). Likewise, the length of the second supporting surface 26 is slightly greater than the length of the first supporting surface 18 so as to provide support for a long beam (for example, 30 feet long). With the configuration of the two supporting surfaces opposite of each other on either side of the cross member 17, the apparatus 10 can simply be inverted to accommodate wider objects. It is also within the scope of the present invention that the apparatus 10 comprises only one supporting surface which can be either the narrower width or the wider width configuration. It is also within the scope of the present invention that the width of either a single supporting surface or both of the supporting surfaces can be variable in the direction of the axis 16 by making the L-shaped brackets that form the supporting surface(s) slidable or otherwise moveable.

The component parts of the apparatus 10 are preferably constructed of metal, but can be formed from other materials that are sufficiently rigid to support the weight of long, heavy objects without significant deformation of the component parts. Preferably, the supporting surfaces have a non-slip surface, such as non-skid tape, for preventing a heavy object from sliding laterally along the supporting surfaces and soft protective surfaces for transporting windows or sliding glass doors. The soft protective surfaces can be provided by a padded insert that is placed on the supporting surface(s).

In an exemplary embodiment the apparatus 10 is constructed of 0.125 inch by 1.5 inch angle iron, 0.75 inch square tube, 0.625 inch rod and 16 inch pneumatic tires. The angle iron forms the supporting surfaces and the square tube acts as the cross members. There are three cross members with the center cross member housing the 0.625 inch rod as the axle. The pneumatic tire/wheel assemblies are held on the axle by 0.1875 inch cotter pins. The cross members are welded to the angle iron with a wire feed gas shielded welder.

In operation of the apparatus of the present invention, a long heavy beam 39 is placed on either the first or the second supporting surface and balanced over the axle 16. Because the supporting surfaces 18 and 26 extend beyond the diameter of the tires, the apparatus 10 can be tipped forward or backward about the axis 16 such that the ends of either set of brackets 19 and 20 or 31 and 33 rest on the ground. Then, either one or two workers can lift one end of the beam 39 and place it on the supporting surface that is facing upward. By placing the apparatus 10 in the center of the beam 39 as seen in FIG. 2 the beam 39 is balanced like a see-saw providing excellent maneuverability over rough terrain. With the beam placed in this position, a single worker can then maintain the balance of the beam 39 on the tires 15 of the apparatus 10 with no portion of the beam 39 touching the terrain over which the beam is to be transported. The supporting surface is located above the axle of the tires and wheels during use and the tires have sufficient diameter to provide adequate clearance between the bottom of the beam and any uneven terrain or obstacles. The beam 39 is then easily transported by one worker over uneven terrain by pushing and steering the beam.

While the present invention has been described with reference to specific embodiments, it should be understood that modifications and variations of the invention may be constructed without departing from the scope of the present invention and such modifications and variations are encompassed by the appended claims.

We claim:

1. A heavy object transporting apparatus, comprising:
   at least two flexible, heavy load capacity tires;
   an axle connecting the tires;
   a first heavy object supporting surface attached above the axle, wherein the first heavy object supporting surface is comprised of a first generally horizontal surface and a first set of at least two members being generally vertical relative to the axle and spaced relative to each other to accommodate a heavy object between each of the members of the first set; and
   a second heavy object supporting surface attached below the axle opposite of the first heavy object supporting surface, wherein the second heavy object supporting surface is comprised of a second generally horizontal surface and a second set of at least two members being generally vertical relative to the axle and spaced relative to each other to accommodate a heavy object between each of the members of the second set.

2. The apparatus of claim 1 wherein each of the flexible, heavy load capacity tires is an inflated tire having about a sixteen inch diameter.

3. The apparatus of claim 2 wherein each tire is capable of supporting about 400 pounds.

4. The apparatus of claim 1 wherein the heavy object supporting surface has a length essentially centered over the axle.

5. The apparatus of claim 4 wherein the heavy object supporting surface length is greater than the diameter of each tire.

6. The apparatus of claim 1 wherein the first heavy object supporting surface is comprised of two elongated L-shaped members to accommodate the heavy object between opposed vertical walls of the elongated L-shaped members.

7. The apparatus of claim 1 wherein the members of the first set each comprise a post located adjacent each outside corner at the far ends of the first heavy object supporting surface to accommodate the heavy object between the posts.

8. The apparatus of claim 1 wherein the second heavy object supporting surface has a length essentially centered over the axle.

9. The apparatus of claim 8 wherein the second heavy object supporting surface length is greater than the diameter of each tire.

10. The apparatus of claim 6 wherein the second heavy object supporting surface is comprised of two elongated L-shaped members to accommodate the heavy object between opposed vertical walls of the elongated L-shaped members.

11. The apparatus of claim 7 wherein the members of the second set each comprise a post located adjacent each outside corner at the far ends of the second heavy object supporting surface to accommodate the heavy object between the posts.

* * * * *